US011668359B2

(12) United States Patent
Adamczak et al.

(10) Patent No.: US 11,668,359 B2
(45) Date of Patent: Jun. 6, 2023

(54) SYSTEM FOR SUCTIONING BRAKING PARTICLES WITH OPTIMIZED CONTROL

(71) Applicant: TALLANO TECHNOLOGIE, Boulogne Billancourt (FR)

(72) Inventors: Loïc Adamczak, Boulogne Billancourt (FR); Christophe Rocca Serra, Boulogne-Billancourt (FR); Thibaut Le Boulaire, Boulogne Billancourt (FR); Adrien Maistre, Boulogne Billancourt (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 0 days.

(21) Appl. No.: 17/291,578

(22) PCT Filed: Nov. 6, 2019

(86) PCT No.: PCT/FR2019/052633
§ 371 (c)(1),
(2) Date: May 5, 2021

(87) PCT Pub. No.: WO2020/094982
PCT Pub. Date: May 14, 2020

(65) Prior Publication Data
US 2021/0396285 A1 Dec. 23, 2021

(30) Foreign Application Priority Data

Nov. 8, 2018 (FR) ..................... 18 60308

(51) Int. Cl.
*F16D 65/00* (2006.01)
*B01D 46/00* (2022.01)
(Continued)

(52) U.S. Cl.
CPC ..... *F16D 65/0031* (2013.01); *B01D 46/0086* (2013.01); *B01D 46/446* (2013.01);
(Continued)

(58) Field of Classification Search
CPC ............ F16D 65/0031; B01D 46/0086; B01D 46/446; B08B 15/04; B08B 15/002
See application file for complete search history.

(56) References Cited

U.S. PATENT DOCUMENTS 6,105,202 A * 8/2000 Grasso ................ A47L 9/2842
706/900
8,597,391 B1 12/2013 Dietz
(Continued)

FOREIGN PATENT DOCUMENTS

DE 42 40 873 6/1994
FR 3 057 040 4/2018

OTHER PUBLICATIONS

Machine translation: DE4240873; Klaumuenzner UWE (Year: 1994).*
(Continued)

*Primary Examiner* — Natasha N Campbell
(74) *Attorney, Agent, or Firm* — Nixon & Vanderhye

(57) ABSTRACT

Disclosed is a system for suctioning braking particles from a friction braking system of a vehicle, the suction system including a negative-pressure source, a suction mouth, a filter, a pneumatic circuit connecting the suction mouth to the negative-pressure source, and a control unit configured to control the negative-pressure source, the suction system also including a pressure sensor for measuring the pressure prevailing in the pneumatic circuit, the control unit controlling the negative-pressure source so that the pressure in the pneumatic circuit reaches or tends to meet a predetermined negative-pressure setpoint, and an associated method.

20 Claims, 4 Drawing Sheets

(51) Int. Cl.
    *B01D 46/44*         (2006.01)
    *B08B 15/00*         (2006.01)
    *B08B 15/04*         (2006.01)
    *B08B 13/00*         (2006.01)

(52) U.S. Cl.
    CPC ............ *B08B 13/00* (2013.01); *B08B 15/002* (2013.01); *B08B 15/04* (2013.01)

(56) References Cited

U.S. PATENT DOCUMENTS

| | | | |
|---|---|---|---|
| 2007/0283521 A1* | 12/2007 | Foster .................. | A47L 9/2889 |
| | | | 15/314 |
| 2010/0011962 A1* | 1/2010 | Totsugi ................ | B08B 15/007 |
| | | | 96/400 |
| 2013/0105252 A1* | 5/2013 | Pahle ................. | F16D 65/0031 |
| | | | 188/71.1 |
| 2017/0248180 A1 | 8/2017 | Metayer | |

OTHER PUBLICATIONS

International Search Report for PCT/FR2019/052633 dated Jan. 23, 2020, 5 pages.
Written Opinion of the ISA for PCT/FR2019/052633 dated Jan. 23, 2020, 4 pages.
Office Action issued in Chinese Patent Application No. 201980076287.7 dated Aug. 29, 2022.
Office Action issued in Chinese Patent Application No. 201980076287.7 dated Jan. 12, 2023.

\* cited by examiner

SYSTEM FOR SUCTIONING BRAKING PARTICLES WITH OPTIMIZED CONTROL

CROSS-REFERENCE TO RELATED APPLICATIONS

This application is the U.S. national phase of International Application No. PCT/FR2019/052633 filed Nov. 6, 2019 which designated the U.S. and claims priority to FR 18 60308 filed Nov. 8, 2018, the entire contents of each of which are hereby incorporated by reference.

TECHNICAL FIELD

The invention relates to systems for suctioning braking particles in friction braking systems. Such friction braking systems can be fitted to road or rail vehicles. Such friction braking systems can also be fitted to stationary rotor machines such as wind turbines or industrial machines.

BACKGROUND AND PRIOR ART

In such systems, as described for example in document DE4240873, a suction turbine and a particle collection filter are provided. The particles from abrasion are thus gradually accumulated in the collection filter. This results in progressive clogging of the filter. This progressive clogging requires a suction power sized for the case where the filter causes a high in-line loss, in order to continue to collect the particles correctly even in the case where the filter has a high level of clogging.

Conversely, when the filter is new, with very little loss in the pneumatic line, the suction power may prove to be oversized and the concomitant noise generated by the turbine rotating at high speed may prove to be annoying.

The object of the present invention is to provide an improved solution relating to the progressive clogging of the filter.

SUMMARY OF THE INVENTION

To this end, a system for suctioning braking particles from a friction braking system of a vehicle is proposed, the suction system comprising:
at least one negative-pressure source (for example a turbine or other means), at least one suction mouth connected by a pneumatic circuit to the negative-pressure source, and a control unit configured to control the negative-pressure source,
characterized in that the suction system further comprises a device for determining the current airflow conditions prevailing in the pneumatic circuit,
and in that the control unit controls the negative-pressure source so that the current airflow conditions in the pneumatic circuit reach or tend to meet at least one setpoint for the airflow conditions.

The term "setpoint for the airflow conditions" is to be understood to mean a predetermined value, but without excluding this setpoint from being a function of time or of operational conditions (see below).

The term "device for determining current airflow conditions" is to be understood to mean either a pressure sensor, a flow sensor, or an electrical measurement device measuring a quantity representative of at least one airflow condition of interest.

As for the term "pneumatic circuit which connects the suction mouth to the negative-pressure source", this is to be understood to mean a fluid conduit which leads from the suction mouth to the turbine, either directly or through a filter. A first conduit is located downstream of the suction mouth in the particles' path, which leads from the suction mouth to the filter; the turbine may be arranged downstream of the filter or vice versa. The first conduit is wholly or partly under negative pressure, without excluding a portion downstream of the turbine from being under positive pressure (filter downstream of the turbine).

By virtue of these arrangements, by linking the control to the desired setpoint for the airflow conditions, a suction efficiency is obtained which is substantially independent of the level of clogging of the filter. Also, when the filter is new, the power required is relatively low and in the case of using a turbine, its speed of rotation is rather low, which makes it possible to guarantee a very moderate noise level. As particles are collected and the level of clogging increases, the system is designed to provide greater suction power to achieve the same desired setpoint for the airflow conditions.

In addition, the use of such a sensor of airflow conditions allows making the operation and the efficiency of the suction system more reliable as well as offering certain diagnostic functions for an abnormal case, for example such as the case where a pipe is disconnected.

In addition, in the case of a specific turbine with electric motor, its management allows obtaining the lowest possible electric consumption for its function, the bare minimum.

The term "negative-pressure source" is to be understood here to mean either a turbine specific to the function of suctioning braking particles, or a negative-pressure source pre-existing in the vehicle and that is used in a controlled manner to suction particles towards the collection filter.

In the case of a pressure measurement, the device for determining the current airflow conditions prevailing in the pneumatic circuit is a pressure sensor for measuring the pressure prevailing in the pneumatic circuit and the pressure represents the current airflow conditions, and the control unit controls the negative-pressure source so that the pressure in the pneumatic circuit reaches or tends to meet a negative-pressure setpoint (DPR).

With these arrangements, suction efficiency is obtained which is substantially independent of the level of clogging of the filter. When the filter is new, the power required is relatively low and in the case of using a turbine, its speed of rotation is rather low, which makes it possible to guarantee a very moderate noise level. As particles are collected and the level of clogging increases, the system is designed to provide greater suction power in order to reach the same desired negative-pressure setpoint in the pneumatic circuit.

Aside from the solution of a pressure sensor, it is possible to use a flow sensor to measure the airflow conditions of interest in the pneumatic circuit, or else an electrical measurement device measuring a quantity representative of at least one airflow condition of interest.

The term "negative-pressure setpoint" is to be understood to mean a predetermined value, but without excluding this negative-pressure setpoint from being a function of time or of operational conditions.

In various embodiments of the invention relating to the system, use may possibly be made of one or more of the following arrangements, individually or in combination.

According to a preferred option, the negative-pressure source is formed by a turbine driven by an electric motor. In this manner, it is provided that the control unit controls the speed of rotation of the electric motor in order to manage the negative pressure created by the turbine. In the case of an electric motor controlled by DC voltage, 12V, 24V, or 72 V for example, provision may be made for the control logic to make use of a control signal modulated by PWM.

According to an alternative option, the negative-pressure source is formed by a negative-pressure source preexisting in the vehicle, in particular, for the case of the automotive sector, a negative-pressure source induced by the operation of the vehicle's engine, for example a bypass from the air intake, or in another example by the use of a Venturi effect on an outflowing stream of gas, for example exhaust gases. In the case of the railway sector, the negative-pressure source may be derived from the pneumatic braking system or from some other auxiliary system of the railway vehicle.

According to one option, the pressure sensor is arranged adjacent to or integrated with the filter. In this manner, a compact mechatronic solution and a simplified assembly are offered.

According to one option, the system can comprise at least one filter for collecting the suctioned particles.

According to one option, the system comprises a centralized filter and turbine, which are connected to four or more suction mouths. In this manner, the cost of the complete solution is optimized. It is possible to provide a single pressure sensor (respectively a single sensor of airflow conditions) to carry out the complete function.

According to one option, the system comprises a decentralized filter and turbine, namely for each suction mouth or pair of suction mouths. In this manner, the power of the negative-pressure source, in particular the speed of rotation of the turbine, is specifically adapted for each of the braking means. It is even possible to have a filter, a turbine, and a suction mouth per pad, or per side of the disc, such as for example in the railway sector.

According to one option, the control unit is configured to detect a predetermined level of clogging of the filter, and to transmit a message to a user. This allows informing the user in question of the need to replace the filter, whether the owner, driver, or person responsible for maintenance of the vehicle in question. In practice, the control unit may transmit a message to a vehicle dashboard or to a remote server in charge of managing the maintenance of the vehicle. Note that when the engine reaches maximum speed, the clogging indicator will be activated when the negative pressure has reached a minimum level which is not the desired setpoint. One will note here that the noise level emitted by the turbine can also serve as an end-of-service-life indicator.

According to one option, the predetermined negative-pressure setpoint is selected within a range of 20 to 40 millibars below ambient pressure. Advantageously, this is an optimal range for efficiently capturing braking particles while maintaining a reasonable and inexpensive sizing and moderate dimensions for the elements of the system.

The invention also relates to a method for controlling a system for suctioning friction braking particles from a braking system of a vehicle, the suction system comprising: at least one negative-pressure source (a turbine or other), at least one suction mouth (83) connected by a pneumatic circuit (3,30) to the negative-pressure source, a control unit (6), and a device for determining the current airflow conditions prevailing in the pneumatic circuit,
the control unit is configured for:
a—controlling the negative-pressure source (for example the rotation of the turbine), according to predetermined activation conditions,
b—measuring the current airflow conditions prevailing in the pneumatic circuit,
c—determining a difference between current airflow conditions and at least one setpoint for the airflow conditions,
d—adjusting the control signals used, in order to adjust the power of the pressure source or to rotate the turbine as a function of said difference.

In the typical case of a pressure measurement, a method is proposed for controlling a system for suctioning friction braking particles from a braking system of a vehicle, the suction system comprising:
at least one negative-pressure source (a turbine or other), at least one suction mouth (83) connected by a pneumatic circuit (3,30) to the negative-pressure source, a control unit (6), and a pressure sensor (22),
the control unit is configured for:
a—controlling the negative-pressure source (for example the rotation of the turbine), according to predetermined activation conditions,
b—measuring the pressure in the pneumatic circuit, by means of the pressure sensor,
c—determining a difference between the current pressure and a negative-pressure setpoint,
d—adjusting the control signals used, in order to adjust the power of the pressure source or to rotate the turbine as a function of said difference.

In various embodiments of the invention relating to the method, use may possibly be made of one or more of the following arrangements, individually or in combination.

According to one option, the control unit is further configured to detect a predetermined level of clogging of the filter, when the control setpoint for the negative-pressure source exceeds a predetermined threshold so that the current airflow conditions reach the setpoint for the airflow conditions.

In the typical case of a pressure sensor, the control unit is configured to detect a predetermined level of clogging of the filter when the control setpoint for the negative-pressure source exceeds a predetermined threshold so that the pressure reaches the predetermined negative-pressure setpoint, or so that the setpoint is not reached despite a command for maximum power of the negative-pressure source.

In the typical case of a pressure sensor and an electrically controlled turbine, the control unit is further configured to detect a predetermined level of clogging of the filter when the control setpoint for rotation of the turbine exceeds a predetermined threshold so that the pressure reaches the predetermined negative-pressure setpoint.

According to one option, the control unit is further configured to transmit a message to a user when a clogging condition is determined. Thus the owner, the driver, or the person in charge of maintenance of the vehicle in question, can be informed of the need to replace the filter.

According to one option, the setpoint (negative pressure or more generally airflow conditions) is not a constant value but can be determined according to various operating conditions (temperature, humidity, vehicle speed). In addition, the setpoint can be a function over time of the braking phase. It is thus possible to refine the management and feedback control of the negative pressure to only what is essential.

According to one option, the negative-pressure source being a turbine, it is provided that when the control signals used to cause the turbine to rotate exceed a predetermined value, the noise level emitted by rotation of the turbine exceeds a certain audible threshold, and can thus be perceived by a user. In other words, the whistling of the turbine is an audible alert which serves as an indicator prompting the user to replace the filter.

DESCRIPTION OF FIGURES

Other features, aims and advantages of the invention will be apparent from reading the following description of an embodiment of the invention, given as a non-limiting example. The invention will also be better understood by referring to the accompanying drawings in which.

DETAILED DESCRIPTION

In the various figures, the same references designate identical or similar elements. For clarity in the presentation, certain elements are not necessarily represented to scale.

Figure 1:
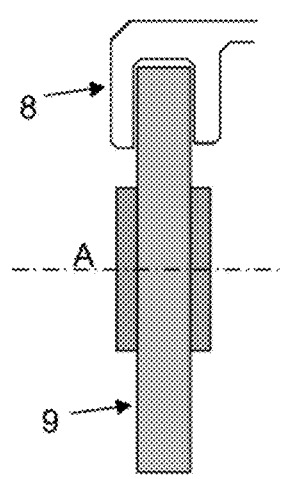
FIG. 1 shows a side view of an example of a friction braking member.

FIG. 1 schematically shows a friction braking member. In the case illustrated, represented is a brake disc 9 intended to be made integral in rotation with a wheel (or an axle for rolling stock). The disc 9 rotates about the axis A. According to the prior art, there is a caliper 7 straddling the disc and mounted on a caliper bracket. In addition, the caliper comprises a piston configured to act on friction pads so as to sandwich the disc. The friction pads (not shown) are mounted on back plates or sole plates, all of this being known per se and not described in detail here.

Although a diagram of a disc brake has been represented, the invention is also suitable for drum brakes, or even systems with brake pads applied directly to the wheel rim.

At the location of the friction pads, a device 8 for capturing escaping particles is provided. More particularly, a suction mouth 83 may be provided for each of the friction pads. An example can be found for example in document FR3057040 of the present Applicant, where the particles are captured in grooves formed in the friction material. The suction mouth may be formed by the groove(s) which in turn are connected to a through-hole in the sole plate of the friction lining and in communication with a passage downstream (towards the filter).

The suction mouth 83 is connected to a negative-pressure source by a pneumatic circuit. The pneumatic circuit may comprise a first conduit 3 and a second conduit 30.

In general, the suction mouth may be in the path of the particles as they exit the interface between the pad and the rotating member (disc, drum, rim, etc.). It is the negative pressure or the flow created at this location that contributes to a good capture.

In other configurations a cowling may be provided, in which case the suction mouth is formed by the outlet from the space covered by said cowling.

It should therefore be understood that the invention can be applied regardless of the configuration of the suction mouth 83.

Typically for a disc brake configuration, there will be a suction mouth 83 on each side of the disc, as shown in FIG. 1.

Figure 2:
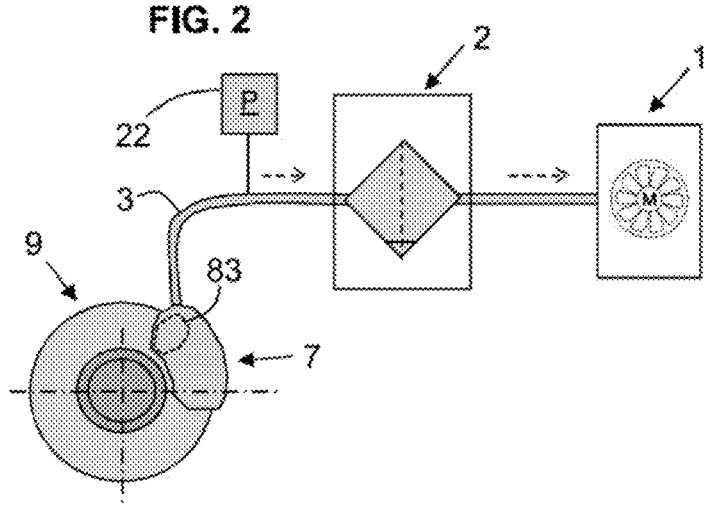
FIG. 2 shows a functional diagram of a localized system for suctioning braking particles, for a wheel or an axle.
Figure 3:
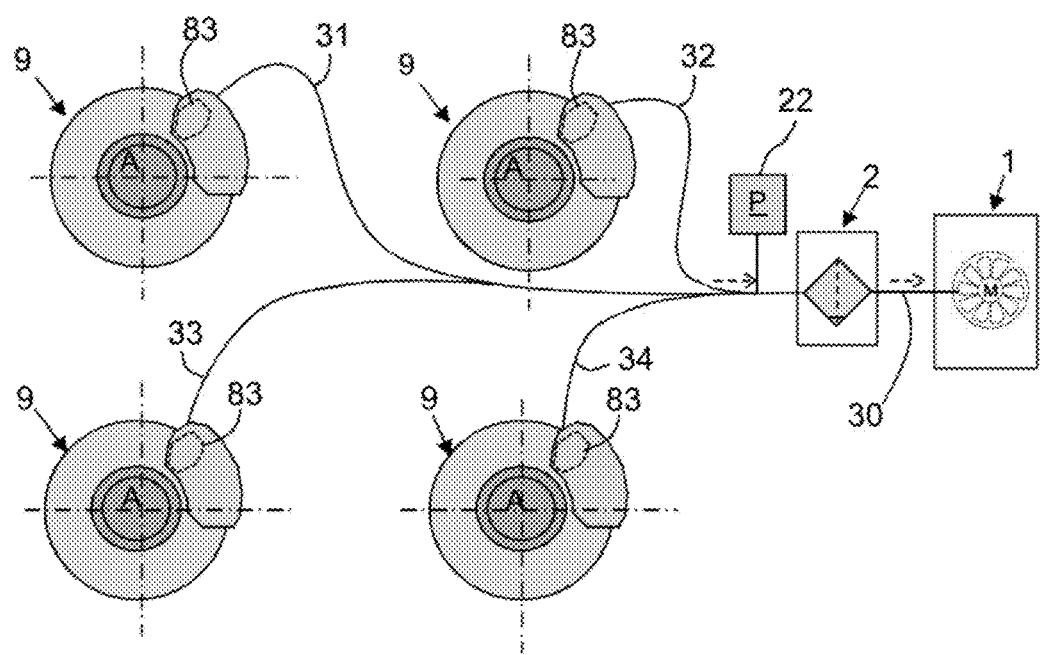
FIG. 3 shows a functional diagram of a centralized system for suctioning braking particles, on several wheels or axles.

The suction mouth (or suction mouths as the case may be) is connected to a filter 2 by a fluid conduit that here is called the first conduit 3, as exemplified in FIG. 2. The first conduit 3 may be formed as piping without excluding a passage in the form of a tunnel through a part (for example the body of the caliper). The first conduit may be of greater or lesser length, this length ranging from a few tens of centimeters, for example 50 cm, to several meters in a centralized filtering configuration as illustrated in FIG. 3.

In general, the fluid connection between the suction mouth and the filter 2 may comprise one or more branches, T connections, Y connections, etc. The term pneumatic circuit can also be used to refer to the fluid conduits/air hose.

The fluid connection between the suction mouth and the filter 2 may comprise rigid portions and flexible hose portions.

Various configurations can be found between the suction mouths, the filter, and the negative-pressure source: there can be one filter for each suction mouth (maximally decentralized configuration) or even for each pair of suction mouths (FIG. 2), but it is also possible to have a single filter for a plurality of pairs of suction mouths (FIG. 3) (so-called centralized configuration), or even a single filter for the entire vehicle. This choice may be dictated by the type of vehicle, the service life required for the filter before clogging, the various constraints on installation within the vehicle, etc.

Figure 6:
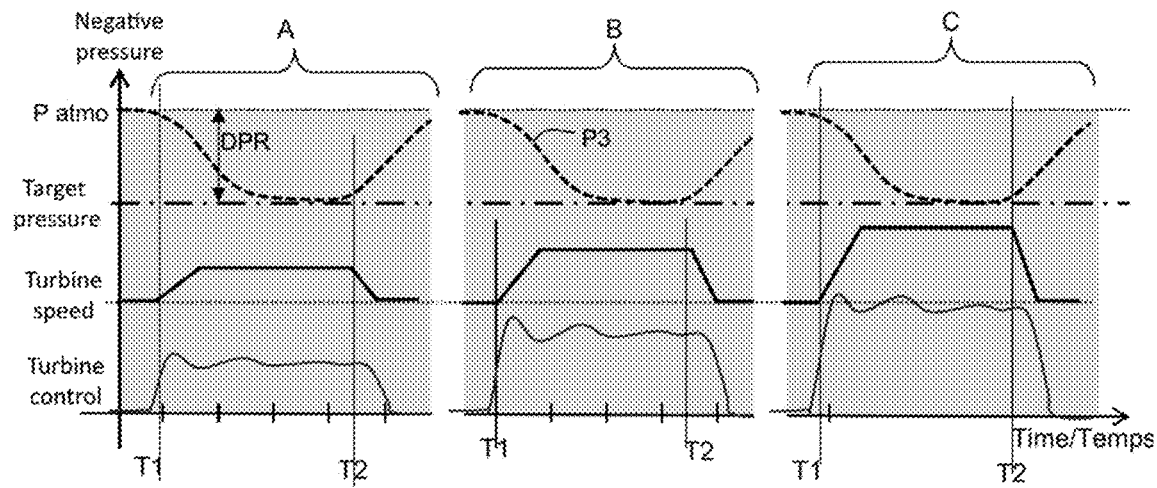
FIG. 6 shows timing diagrams illustrating at least one functionality of the system.
Figure 7:
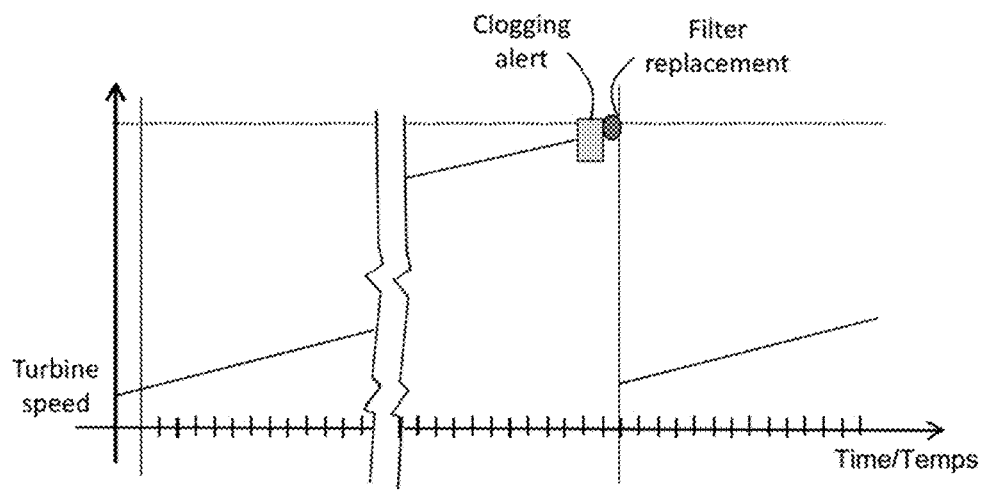
FIG. 7 shows timing diagrams illustrating at least one functionality of the system.

In FIGS. 2, 6 and 7, a negative-pressure configuration is shown with the filter interposed between the first conduit 3 and the negative-pressure source 1 which suctions the particles through the filter which is then at a negative pressure relative to the external ambient pressure. However, in a configuration shown in FIG. 9, the negative-pressure source (here the turbine 1) may be interposed between the first conduit 3 and the filter, in which case the turbine sucks the particles in and then the turbine blows them into the filter via a downstream conduit denoted 3'. In this case, the filter 2 is at positive pressure instead of negative pressure.

In a typical embodiment, the filter 2 may comprise a filter medium, of paper or some other type, allowing air to pass through and trapping the small particles contained in the stream coming from the suction mouths.

The term 'filter' is to be understood broadly here: this term comprises centrifugal filter solutions ('cyclone' type), filter solutions with an electromagnetic trapping technique, and filter solutions with an electrostatic trapping technique. The term 'filter' also includes a solution where the particles are directed towards an already existing filter such as the passenger compartment air filter or towards the filter of the catalytic converter.

The particle filter 2 is configured to filter air coming from the suction mouths which is carrying solid particles having micrometric or millimetric dimensions, in other words allowing air to pass through the filter medium while the particles do not pass through the filter medium and are trapped thereon. The amount of particles trapped in the filter medium increases as time passes, so the filter 2 operates by accumulation, and the passage of air through the filter medium becomes more difficult as time passes.

In the example illustrated, the negative-pressure source 1 is formed by a suction turbine 10 driven by an electric motor 11.

In the example illustrated, the turbine with its electric motor forms a separate entity from the filter. Under these conditions, a second pneumatic fluid conduit 30 is provided to connect the turbine to the filter.

It should be noted that a configuration with the turbine and filter as a single entity is also possible.

According to an advantageous arrangement of the invention, there is also provided a pressure sensor 22 configured to measure the pressure prevailing in the first conduit 3.

The pressure sensor in question represents one solution among a set of solutions which allow determining the airflow conditions prevailing in the first conduit. Thus we can generalize the pressure sensor to a concept of a device for determining the airflow conditions, which shows that a solution of pressure sensors also covers an air flow sensor, and a sensor measuring resistance to rotation observed at the rotor of the turbine.

In the block diagram of FIG. 2, the pressure sensor 22 is arranged on the path of the first conduit 3, between at least one suction mouth and the filter 2.

Figure 5:
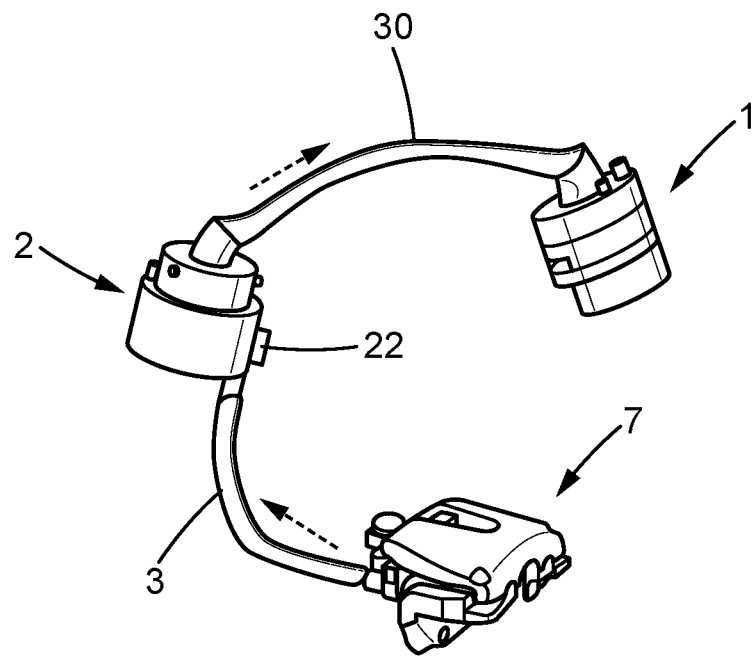

However, in an alternative and equally preferred configuration, the pressure sensor 22 is arranged adjacent to or integrated with the filter 2, as illustrated in FIG. 5.

The pressure sensor may be of any technological type: membrane, capsule, Pitot tube, etc.

According to one example, a Freescale™ brand MPX5700DP sensor may be selected. According to one example, a piezoresistive sensor may be selected.

In practice, the pressure sensor 22 measures a pressure difference between the ambient pressure and the pressure prevailing at its relevant input.

The suction system further comprises a control unit 6 configured to control the turbine.

The control unit 6 is an electronic unit capable of generating a control signal to control the speed of the motor which drives the turbine, according to any value between zero speed and the maximum possible speed.

According to one example, the electric motor is powered by DC voltage; provision may be made for the control logic to make use of a signal modulated by PWM (pulse width modulation). The DC voltage used may depend on the field of application of the system for suctioning particles, for example 12 volts in conventional motor vehicles, 24 volts in heavy-duty or industrial vehicles such as trucks or buses, or even 72 volts in rolling stock (tram, train).

It should be noted here that instead of a suction turbine, the negative-pressure source may be preexisting in the vehicle, in particular, for the case of the automotive sector, a negative-pressure source caused by operation of the vehicle's engine, for example a bypass from the air intake, or else for example by the use of a Venturi effect on an outflowing stream of gas, for example exhaust gases. In the case of the railway sector, the negative-pressure source may be derived from the pneumatic braking system or from another auxiliary system of the railway vehicle in question.

The inventors have discovered that the system can provide optimum operation when a desired negative-pressure value is made to prevail inside the first conduit 3. From there, they have determined an operation of interest that consists of obtaining a negative-pressure setpoint in the first conduit, in other words also at the location where the pressure sensor measures the prevailing pressure there.

According to an advantageous configuration, the predetermined negative-pressure setpoint DPR is selected within a range of 20 to 40 millibars below the ambient pressure; in other words, in the scale of absolute pressures, the absolute pressure setpoint in the first conduit can be expressed by PC=Patmo−DPR, Patmo being the atmospheric pressure prevailing in the vicinity of the suction system.

As indicated above, with the pressure sensor 22 measuring a pressure relative to the ambient pressure, the control unit 6 controls the negative-pressure source so that the pressure in the first conduit reaches or tends to meet a predetermined negative-pressure setpoint, in other words so that the negative pressure in the conduit and in the suction mouth is equal to DPR. It should be noted here that the negative-pressure setpoint may be a fixed predetermined value, but as will be seen below, the setpoint may also be a calibration parameter, comprising several target values depending on the phase of the braking sequence, or even a curve over time.

Figure 4:
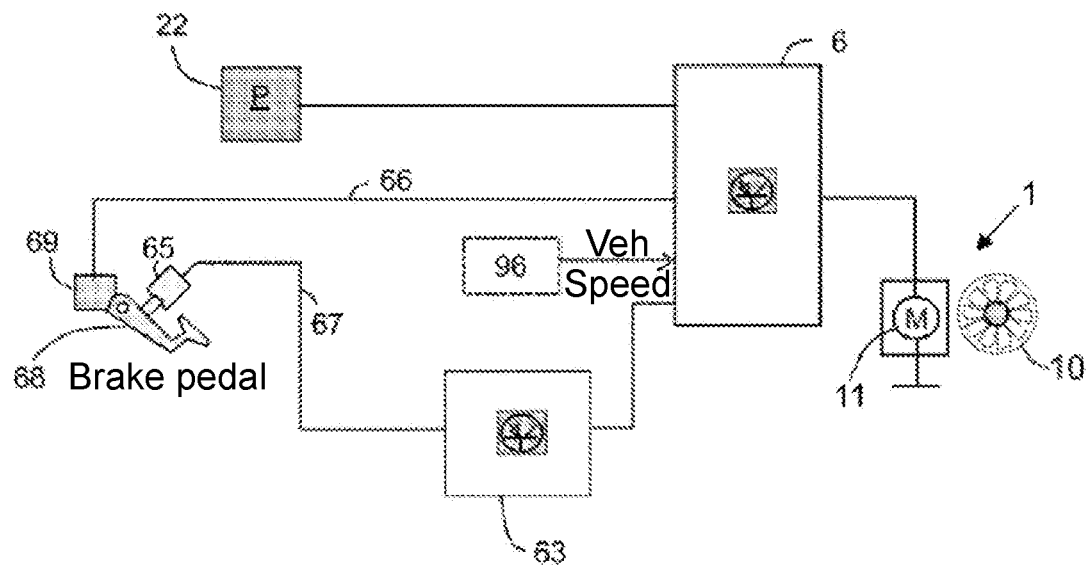
FIG. 4 shows a functional block diagram of a system for suctioning braking particles, FIG. 5 provides a physical illustration of the components of the system for suctioning braking particles.

As can be seen in FIG. 4, the control unit 6 receives information which, in addition to coming from the pressure sensor 22, comes from other elements present on board the vehicle, in particular from the braking actuator which controls the friction braking mentioned above. The braking actuator may be a pedal or a manipulator depending on the type of stock or vehicles concerned (rail car, etc.).

In some configurations, there is simply a binary on/off switch in interaction with the brake pedal 68. This switch may deliver information 67 directly to the control unit 6 of the suction system or else via a control unit 63 for the braking function, for example the unit which manages the ABS function. According to another configuration, a greater wealth of information may be provided, analog or digital, precisely reflecting the current position of the brake pedal, which allows the control unit 6 to know the braking intensity as well as be able to act very early once the action of the user or the driver on the brake pedal begins. In this case, an analog or digital potentiometer 69 is provided, which delivers detailed information 66 intended for the control unit 6 of the suction system.

With the aid of three timing diagram segments, FIG. 6 illustrates three different states/levels of clogging of the filter.

The curve in the upper part represents the pressure denoted P3 prevailing inside the first conduit 3, in other words substantially the suction pressure applied at the suction mouth 83.

The curve in the lower part of the graph represents the controlling of the motor 11 of the turbine, for example characterized by its average control current.

The curve located in the middle part represents the speed of rotation of the turbine.

T1 denotes the start of the braking sequence, while T2 denotes the end of the braking sequence.

It can be seen that when the filter is in new condition, in the left timing digram 'A', the target pressure (i.e. Patmo−DPR) is obtained with a low turbine speed and an equally low control current.

In comparison, in the middle timing diagram 'B', where use of the filter has already been substantial, in order to reach the same target pressure (i.e. Patmo−DPR) the turbine speed is higher and the control current is also higher.

In comparison, in the left timing diagram 'C', the filter has a fairly high level of clogging, and to reach the same target pressure (i.e. Patmo−DPR), the turbine speed is even higher and the control current is even higher.

More precisely, the control unit 6 comprises an automation loop (feedback control) which, as soon as the conditions for activating suction are present, seeks to have the pressure in the first conduit reach the target pressure Patmo−DPR as soon as possible.

Expressed in another form, the control unit implements a method comprising at least the following actions:

controlling the rotation of the turbine, according to predetermined activation conditions (information from the brake pedal for example), measuring the pressure in the first conduit 3, by means of the pressure sensor 22, determining a difference between the current pressure and a predetermined negative-pressure setpoint DPR, adjusting the control signals used in order to adjust the power of the speed of rotation of the turbine as a function of said difference.

Depending on the speed of rotation obtained by the feedback loop, the control unit is configured to estimate a level of clogging of the filter; in fact, the higher the speed of rotation obtained by feedback control, the more clogged the filter. To this end, the control unit may include a conversion curve or even a nomogram.

In practice, therefore, a progressive increase in the turbine speed obtained by regulation or feedback control is observed, as illustrated in FIG. 7.

The control unit is configured to detect a predetermined level of clogging of the filter, which in practice corresponds to the imminent need to change the filter. This is illustrated in FIG. 7, where a clogging alert is determined when the turbine speed reaches the maximum allowable speed for the turbine motor or else the negative-pressure setpoint DPR cannot be reached, even with a command for maximum power.

According to one option, under such a condition, the control unit is configured to transmit a message to a user.

To illustrate the orders of magnitude, the power consumed by the turbine 10 and its electric motor 11 can range from around thirty watts to more than one kilowatt; in practice this power may be comprised within a range of [30 W–800 W] depending on the number of suction mouths to be served and also depending on the length of the piping, which generate a slight pressure drop.

In one configuration, the speed of the turbine can range from 0 to 12,000 rpm.

In one configuration, the speed of the turbine can range from 0 to 30,000 rpm.

The response time of the turbine in order to go from zero to the setpoint speed can typically be between 100 ms and 700 ms, most often between 400 ms and 600 ms for automotive applications.

In FIG. 3 we find a centralized filter, a centralized pressure sensor, and pipes or hoses 31, 32, 33, 34 which make it possible to connect each of the suction mouths 83 to the filter 2.

Note that there may be several filters served by the same turbine.

Figure 9:
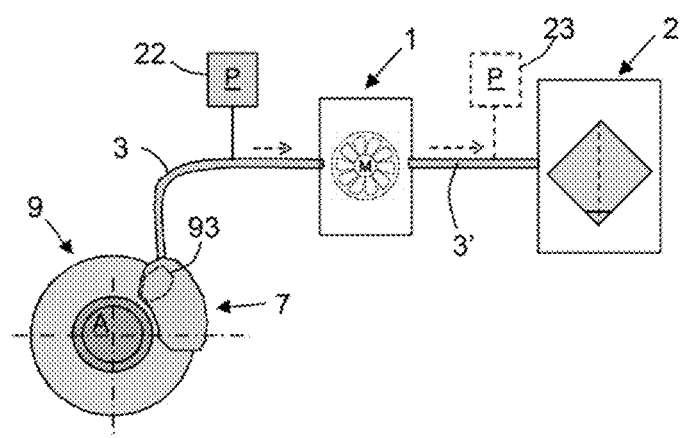
FIG. 9 shows a variant of the functional diagram of a system for suctioning braking particles.

In FIG. 9, the turbine 1 is interposed between the first conduit 3 and the filter. The turbine sucks in the particles then the turbine blows them into the filter via the downstream conduit denoted 3'. In this case, the filter 2 is at positive pressure instead of negative pressure.

The control logic may use a sensor 22 measuring the negative pressure in the first conduit and/or an auxiliary sensor 23 measuring the positive pressure in the downstream conduit 3'. The feedback-control setpoint may concern one or the other of the sensors or even a combination of the two.

Figure 8:
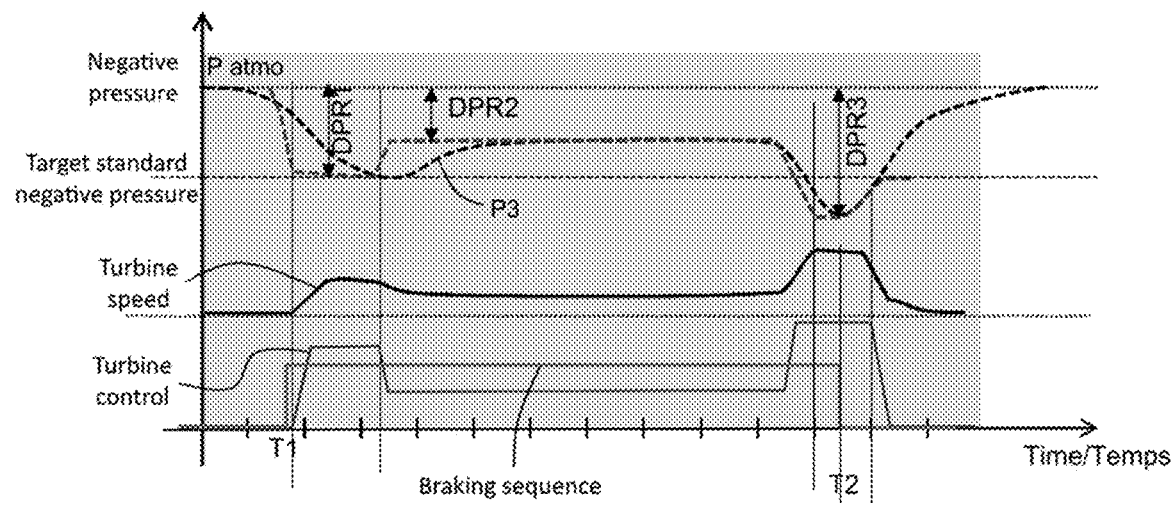
FIG. 8 shows a timing diagram illustrating a variant functionality of the system.

As illustrated in FIG. 8, a variant provides for the feedback-control setpoint not to be a predetermined fixed value, but rather several setpoints which depend on the current phase of the braking sequence.

The curve denoted P3 represents the pressure prevailing inside the first conduit 3, in other words substantially the suction pressure applied at the suction mouth 83. T1 denotes the start of the braking sequence while T2 denotes the end of the braking sequence.

It is thus possible to provide three negative-pressure setpoints, a standard setpoint denoted DPR1, a reduced negative-pressure setpoint denoted DPR2, and an increased negative-pressure setpoint denoted DPR3.

The increased negative-pressure setpoint DPR3 is selected for example at the start of braking and at the end of the braking sequence. The reduced negative-pressure setpoint DPR2 is selected for example in the middle of the braking sequence.

According to the example shown in FIG. 8, at the start of braking, a first standard negative pressure denoted DPR1 is applied, during the intermediate braking phase the reduced negative-pressure setpoint DPR2 is applied, and at the end of the braking phase the increased negative pressure setpoint DPR3 is applied. According to one option, temporally the increased negative-pressure setpoint is applied beyond the release of the friction brake in a phase called the extension phase which serves to clean the suction mouth as well as the first conduit of the particles located therein.

The invention claimed is:

1. A system for suctioning braking particles from a friction braking system in a vehicle, the suction system comprising:
   at least one negative-pressure source;
   at least one suction mouth connected by a pneumatic circuit to the at least one negative-pressure source;
   a controller configured to control the at least one negative-pressure source; and
      a pressure sensor configured to determine current airflow conditions in the pneumatic circuit,
      wherein the controller controls the negative-pressure source so that the current airflow conditions in the pneumatic circuit reach or meet a setpoint for the airflow conditions selected from a plurality of setpoints depending on time of a braking phase of the vehicle.

2. The system according to claim 1, wherein the pressure sensor is configured to measure the pressure in the pneumatic circuit and the pressure representing the current airflow conditions, and
   the controller controls the negative-pressure source so that the pressure in the pneumatic circuit reaches or meets a predetermined negative-pressure setpoint.

3. The system according to claim 1, wherein the at least one negative-pressure source is formed by a turbine driven by an electric motor.

4. The system according to claim 1, further comprising at least one filter configured to collect the suctioned braking particles.

5. The system according to claim 2, wherein the negative-pressure source is formed by a turbine driven by an electric motor, and
   wherein the pressure sensor is adjacent to or integrated with a filter.

6. The system according to claim 1, further comprising a centralized filter and a turbine, which are connected to four or more suction mouths.

7. The system according to claim 1, further comprising:
   at least one pair of suction mouths; and
   a decentralized filter and a turbine, for each of the suction mouths or the at least one pair of suction mouths.

8. The system according to claim 1, wherein the controller is configured to detect a predetermined level of clogging of a filter and to transmit a message.

9. The system according to claim 1, wherein the predetermined negative-pressure setpoint is selected within a range of 20 to 40 millibars below ambient pressure.

10. A method for controlling a system for suctioning friction braking particles from a braking system of a vehicle, the suction system including at least one negative-pressure source, at least one suction mouth connected by a pneumatic circuit to the at least one negative-pressure source, a controller, and a pressure sensor configured to determine the current airflow conditions in the pneumatic circuit, the method comprising:

controlling, by the controller, the at least one negative-pressure source, according to predetermined activation conditions;

measuring the current airflow conditions in the pneumatic circuit;

determining, by the controller, a difference between current airflow conditions and at least one setpoint for the airflow conditions selected from a plurality of setpoints depending on time of a braking phase of the vehicle; and adjusting, by the controller, control signals used, in order to adjust the power of the at least one negative-pressure source or to rotate the at least one negative-pressure source as a function of said difference.

11. The method according to claim 10, wherein the pressure sensor is configured to measure the pressure prevailing in the pneumatic circuit, the pressure representing the current airflow conditions, the measuring the current airflow conditions comprises measuring the pressure in the pneumatic circuit, by the pressure sensor, and the determining the difference between the current airflow conditions and the at least one setpoint comprises determining a difference between the current pressure and a negative-pressure setpoint that is the function over time of the braking phase of the vehicle.

12. The method according to claim 10, further comprising detecting, by the controller, a predetermined level of clogging of a filter, when the control setpoint for the negative-pressure source exceeds a predetermined threshold, so that the current airflow conditions reach the value of the predetermined setpoint for the airflow conditions.

13. The method according to claim 10, further comprising transmitting, by the controller, a message when a clogging condition is determined.

14. The method according to claim 10, wherein the pressure source is a turbine, and the control signals cause the turbine to rotate and emit noise exceeding a specific audible threshold able to be perceived by a user when the control signals exceed a predetermined value.

15. The system according to claim 2, wherein the negative-pressure source is formed by a turbine driven by an electric motor.

16. The system according to claim 2, further comprising at least one filter configured to collect the suctioned braking particles.

17. The system according to claim 3, further comprising at least one filter configured to collect the suctioned braking particles.

18. The system according to claim 2, further comprising a centralized filter and a turbine, which are connected to four or more suction mouths.

19. The system according to claim 3, further comprising a centralized filter and a turbine, which are connected to four or more suction mouths.

20. The system according to claim 4, further comprising a centralized filter and a turbine, which are connected to four or more suction mouths.

* * * * *